United States Patent
Lei et al.

(10) Patent No.: US 12,091,349 B2
(45) Date of Patent: Sep. 17, 2024

(54) LASER DICING GLASS WAFERS USING ADVANCED LASER SOURCES

(71) Applicant: Applied Materials, Inc., Santa Clara, CA (US)

(72) Inventors: Wei-Sheng Lei, San Jose, CA (US); Mahendran Chidambaram, Saratoga, CA (US); Kangkang Wang, San Jose, CA (US); Ludovic Godet, Sunnyvale, CA (US); Visweswaren Sivaramakrishnan, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 209 days.

(21) Appl. No.: 17/836,162

(22) Filed: Jun. 9, 2022

(65) Prior Publication Data
US 2023/0002268 A1 Jan. 5, 2023

Related U.S. Application Data

(60) Provisional application No. 63/216,785, filed on Jun. 30, 2021.

(51) Int. Cl.
*B23K 26/38* (2014.01)
*B23K 26/00* (2014.01)
(Continued)

(52) U.S. Cl.
CPC ...... *C03B 33/0222* (2013.01); *B23K 26/0006* (2013.01); *B23K 26/0624* (2015.10);
(Continued)

(58) Field of Classification Search
CPC ............ B23K 26/0006; B23K 26/0624; B23K 26/0861; B23K 26/38; B23K 2101/40;
(Continued)

(56) References Cited

U.S. PATENT DOCUMENTS 9,701,581 B2 7/2017 Kangastupa et al.
10,144,088 B2 12/2018 Hosseini
(Continued)

FOREIGN PATENT DOCUMENTS

KR 10-2011-0139007 A 12/2011
WO 2017-216603 A1 12/2017

OTHER PUBLICATIONS

International Search Report and Written Opinion for International Application No. PCT/US2022/032755 dated Sep. 23, 2022.

*Primary Examiner* — Leo B Tentoni
(74) *Attorney, Agent, or Firm* — Patterson + Sheridan, LLP

(57) ABSTRACT

A method and apparatus for substrate dicing are described. The method includes utilizing a laser to dice a substrate along a dicing path to form a perforated line around each device within the substrate. The dicing path is created by exposing the substrate to bursts of laser pulses at different locations around each device. The laser pulses are delivered to the substrate and may have a pulse repetition frequency of greater than about 25 MHz, a pulse width of less than about 15 picoseconds, and a laser wavelength of about 1.0 μm to about 5 μm.

23 Claims, 7 Drawing Sheets

(51) Int. Cl.
- *B23K 26/0622* (2014.01)
- *B23K 26/08* (2014.01)
- *B23K 26/55* (2014.01)
- *C03B 33/02* (2006.01)
- *C03B 33/10* (2006.01)
- *C03C 23/00* (2006.01)
- *B23K 101/40* (2006.01)
- *B23K 103/00* (2006.01)

(52) U.S. Cl.
CPC .......... *B23K 26/0861* (2013.01); *B23K 26/55* (2015.10); *C03B 33/102* (2013.01); *C03C 23/0025* (2013.01); *B23K 2101/40* (2018.08); *B23K 2103/42* (2018.08); *B23K 2103/50* (2018.08); *B23K 2103/54* (2018.08); *B23K 2103/56* (2018.08); *B29C 2791/009* (2013.01)

(58) Field of Classification Search
CPC ............ B23K 2103/42; B23K 2103/50; B23K 2103/54; B23K 2103/56; B29C 2791/009; C03B 33/0222; C03B 33/102; C03C 23/0025

USPC ....... 264/400, 482; 65/105, 166; 219/121.67
See application file for complete search history.

(56) References Cited

U.S. PATENT DOCUMENTS

| | | | |
|---|---|---|---|
| 10,179,374 | B2 | 1/2019 | Bovatsek et al. |
| 2011/0240617 | A1* | 10/2011 | Xu .................. B23K 26/38 219/121.67 X |
| 2012/0322236 | A1 | 12/2012 | Lei et al. |
| 2015/0166396 | A1* | 6/2015 | Marjanovic ......... C03B 33/0222 428/137 |
| 2015/0209898 | A1 | 7/2015 | Kim et al. |
| 2016/0276794 | A1* | 9/2016 | Rosales ................ H01S 5/0657 |
| 2016/0318122 | A1* | 11/2016 | Ota ....................... C03B 33/102 |
| 2017/0250113 | A1 | 8/2017 | Vanagas et al. |
| 2019/0299329 | A1* | 10/2019 | Sun .................... B23K 26/0624 |
| 2020/0324368 | A1 | 10/2020 | Hosseini |

\* cited by examiner

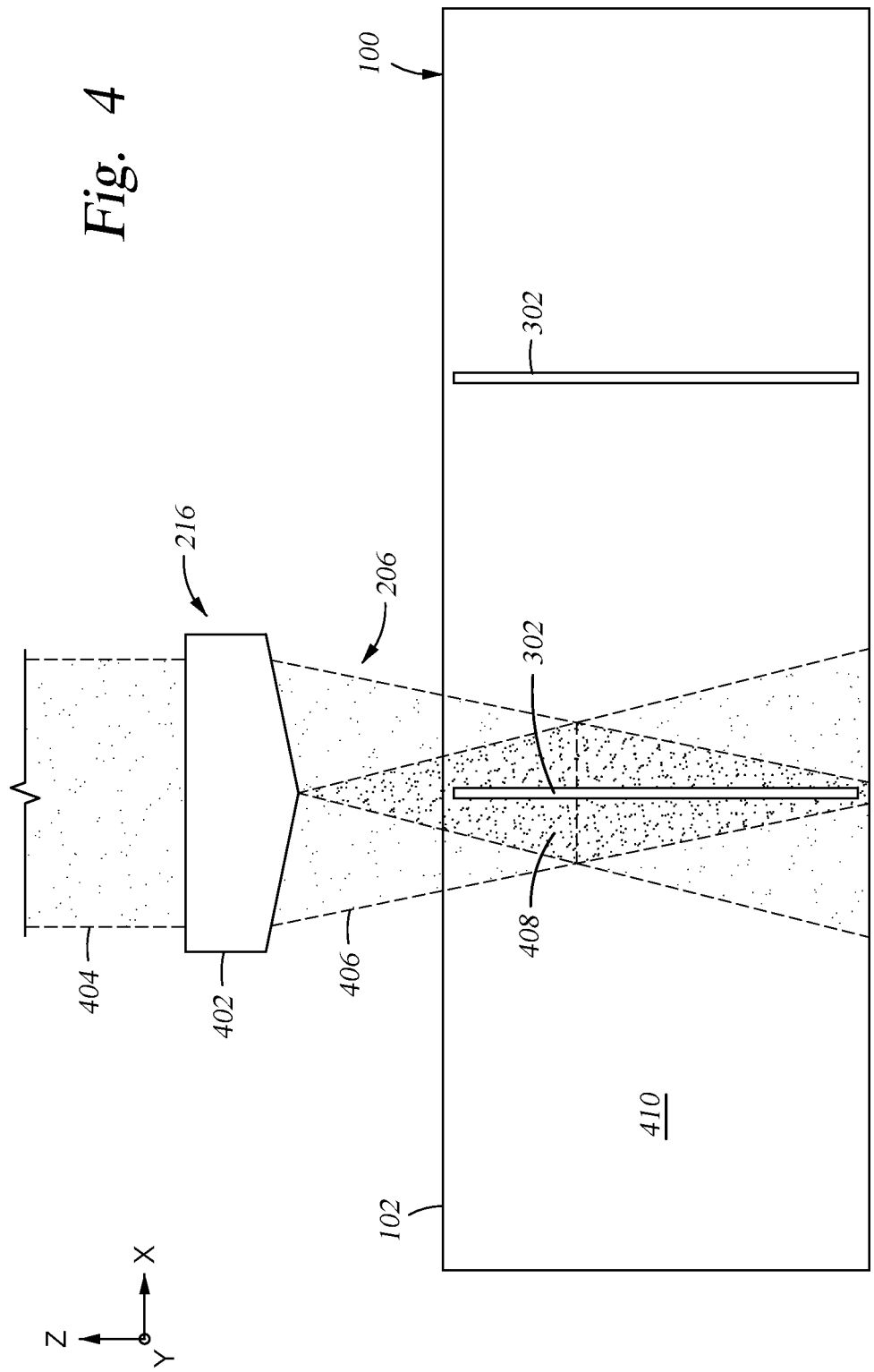

LASER DICING GLASS WAFERS USING ADVANCED LASER SOURCES

CROSS-REFERENCE TO RELATED APPLICATIONS

This application claims priority to U.S. Provisional Patent Application No. 63/216,785, filed Jun. 30, 2021, the entirety of which is herein incorporated by reference.

BACKGROUND

Field

Embodiments of the present disclosure generally relate to optical devices. Specifically, embodiments of the present disclosure relate to methods for dicing one or more optical devices from a substrate with a laser machining system.

Description of the Related Art

Virtual reality (VR) is generally considered to be a computer generated simulated environment in which a user has an apparent physical presence. A VR experience can be generated in 3D and viewed with a head-mounted display (HMD), such as glasses or other wearable display devices that have near-eye display panels as lenses to display a VR environment that replaces an actual environment.

Augmented reality (AR), however, enables an experience in which a user can still see through the display lenses of the glasses or other HMD device to view the surrounding environment, yet also see images of virtual objects that are generated for display and appear as part of the environment. AR can include any type of input, such as audio and haptic inputs, as well as virtual images, graphics, and video that enhance or augment the environment that the user experiences. In order to achieve an AR experience, a virtual image is overlaid on an ambient environment, with the overlaying performed by optical devices.

Multiple optical devices are fabricated on a substrate and then diced prior to use on VR and AR devices. Conventional methods of dicing optically transparent materials, such as glass and silicon carbide (SiC) substrates, include laser ablation cutting or filamentation. During the methods for dicing one or more optical devices from a substrate, it is critical to accurately dice the optical devices from the substrate to retain the quality of the optical devices. The optical devices, generally including high bandgap materials, are brittle, and are sensitive to thermal or mechanical stresses. Current methods of dicing the optical devices from the substrate create separation boundaries and sidewalls with poor surface roughness along the edge of each of the AR/VR devices. Surface roughness of the sidewalls may be greater than about 0.5 µm. Thermal stress within the substrate along the dicing path also contributes to higher sidewall surface roughness and cracking within the device.

Accordingly, there is a need for improved methods for dicing one or more optical devices from a substrate with a laser machining system.

SUMMARY

The present disclosure generally relates to methods of dicing a substrate. In one embodiment, a method of dicing the substrate includes forming a plurality of voids within the substrate along a dicing path. The plurality of voids are formed by exposing the substrate to a burst of laser pulses, each of the laser pulses within the burst have a pulse width of less than about 15 picoseconds and a pulse repetition frequency of greater than about 30 MHz.

In another embodiment, a method of dicing the substrate includes forming a plurality of voids within the substrate along a dicing path. The plurality of voids are formed by exposing the substrate to a plurality of laser pulses. Each of the laser pulses has a laser wavelength of about 1.0 µm to about 5 µm and a pulse repetition frequency of greater than about 50 MHz.

In yet another embodiment, a non-transitory computer-readable medium is described. The non-transitory computer-readable medium stores instructions that, when executed by a processor, cause a computer system to perform operations. The operations include forming a plurality of voids within a substrate along a dicing path by exposing the substrate to a plurality of laser pulses. Each of the laser pulses has a laser wavelength of about 1.0 µm to about 5 µm and a pulse repetition frequency of greater than about 50 MHz.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 4 is a schematic, cross-sectional view of an optical array according to embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to optical devices. Specifically, embodiments of the present disclosure relate to methods for dicing one or more optical devices from a substrate with a laser machining system. Substrate materials such as silica glass and other types of glass materials have high bandgaps. In some embodiments, glass substrates formed from silicon oxide ($SiO_2$) have a bandgap of about 9.2 eV and therefore are optically transparent over a broad wavelength spectrum. However, when a laser is tightly focused to less than 5 µm and has a desired pulse intensity, a phase transformation is generated within the substrate due to nonlinear optical absorption. The phase transformation generates voids or cracking in the glass substrate. The voids or cracks are propagated along a line to form a void array. The void array is referred to as a dicing path. The dicing path is formed by moving a laser after each burst of laser pulses and forms a perforated barrier. Different portions of the substrate are then separated along the dicing path.

Each of the voids/cracks is formed discreetly. Therefore, during separation of the substrate along the dicing path the separated wall of the substrate has a side wall surface roughness. The side wall surface roughness has a negative effect on the performance of AR/VR devices. Therefore, embodiments described herein are directed towards apparatus and methods for reducing the side wall surface roughness. The side wall surface roughness is reduced to less than 0.3 μm using the methods described herein. The surface roughness is reduced by reducing the void diameter and the void pitch of each of the voids formed within the substrate. Smaller void diameters and void pitches lead to lower surface roughness. Lowering pulse energy applied to the substrate and the pulse width also reduces the thermal stress and the void diameter within the substrate.

Figure 1:
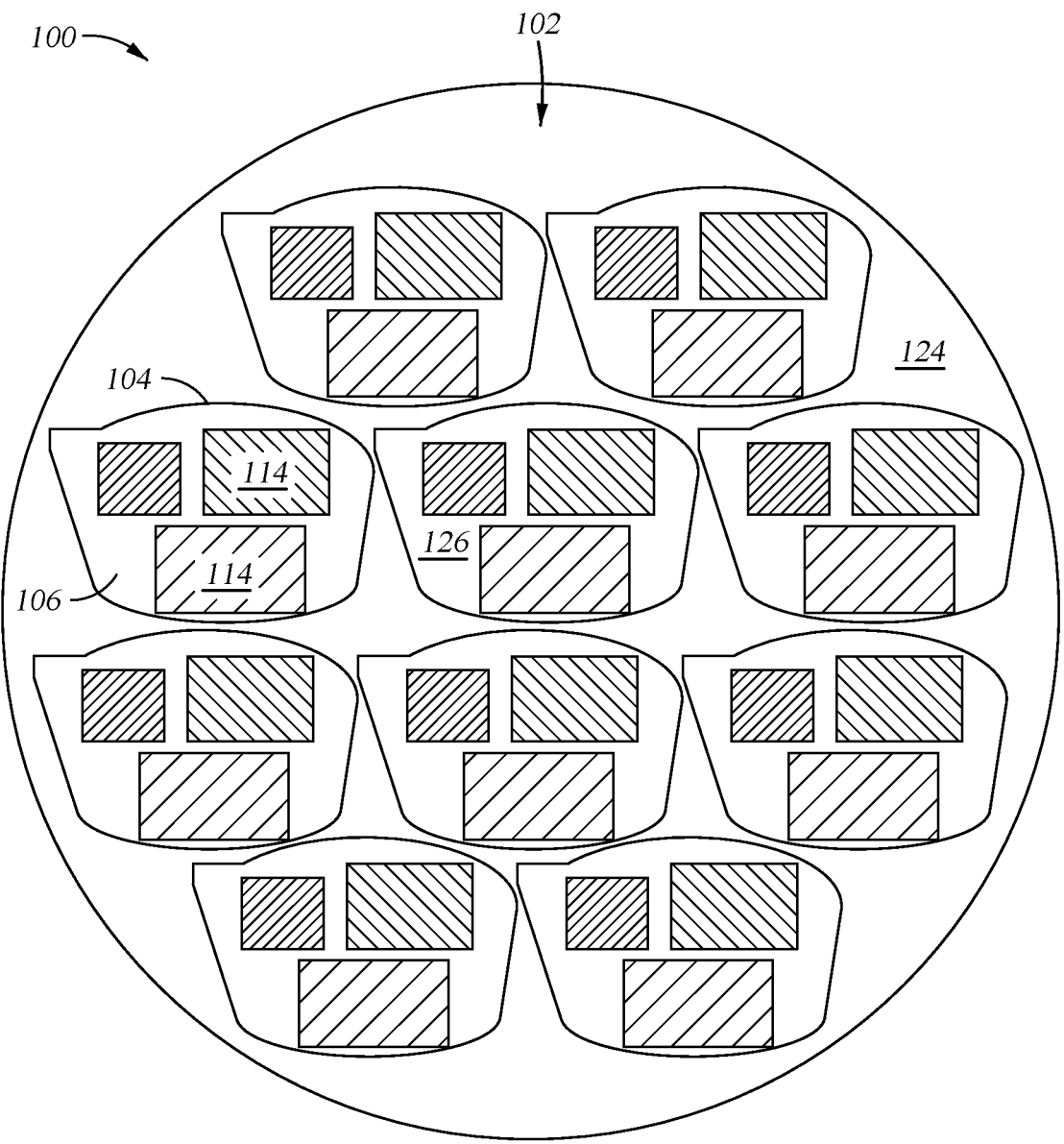
FIG. 1 is a schematic, top-view of a substrate according to embodiments.

FIG. 1 is a schematic, top-view of a substrate 100. The substrate 100 includes a top surface 102 and a bottom surface 103 (FIG. 2) opposite the top surface 102. The substrate 100 includes one or more optical devices 106, disposed on the top surface 102 and/or the bottom surface 103 of the substrate. The one or more optical devices 106 can include structures 114 (i.e., fins) having sub-micron critical dimensions, e.g., nano-sized critical dimensions.

The substrate 100 may be formed from any suitable material, provided that the substrate 100 can adequately transmit or absorb light in a desired wavelength or wavelength range and can serve as an adequate support for the one or more optical devices 106. Substrate selection may include any suitable material, including, but not limited to, amorphous dielectrics, crystalline dielectrics, aluminum nitride, silicon oxide, silicon carbide, polyhedral oligomeric silsesquioxane (POSS) and other polymers, and combinations thereof. In some embodiments, which can be combined with other embodiments described herein, the substrate 100 includes a transparent material. Suitable examples may include an oxide, sulfide, phosphide, telluride or combinations thereof. Additionally, the substrate 100 may be varying shapes, thicknesses, and diameters. For example, the substrate 100 may have a diameter of about 150 mm to about 300 mm. The substrate 100 may have a circular, rectangular, or square shape. The substrate 100 may have a thickness of between about 300 μm to about 1 mm. The bandgap of the material of the substrate is about 5 eV to about 12 eV, such as about 6 eV to about 10 eV, such as about 8 eV to about 10 eV, such as about 9.2 eV.

It is to be understood that the one or more optical devices 106 described herein are exemplary optical devices. In one embodiment, which can be combined with other embodiments described herein, an optical device of the one or more optical devices 106 is a waveguide combiner, such as an augmented reality waveguide combiner. In another embodiment, which can be combined with other embodiments described herein, an optical device of the one or more optical devices 106 is a flat optical device, such as a metasurface.

Each optical device 106 of the one or more optical devices 106 includes a dicing path 104. The dicing path 104 is disposed around the exterior edge of each optical device 106. The dicing path 104 is the desired dicing path for a laser (shown in FIG. 2) to travel along during the method 600 (FIG. 6) such that the quality of the optical device 106 is maintained. Although only ten optical devices 106 are shown on the substrate 100, any number of optical devices 106 may be disposed on the substrate 100. The portion of the substrate 100 which corresponds to each of the optical devices 106 is an optical device portion 126. The portion of the substrate 100 which is outside of the optical device portions 126 is an outer portion 124. During methods described herein, the optical device portions 126 forming each of the optical devices 106 are separated from the outer portion 124 of the substrate 100 along the dicing paths 104. The optical devices 106 may be separated via mechanical or thermal separation.

Figure 2:
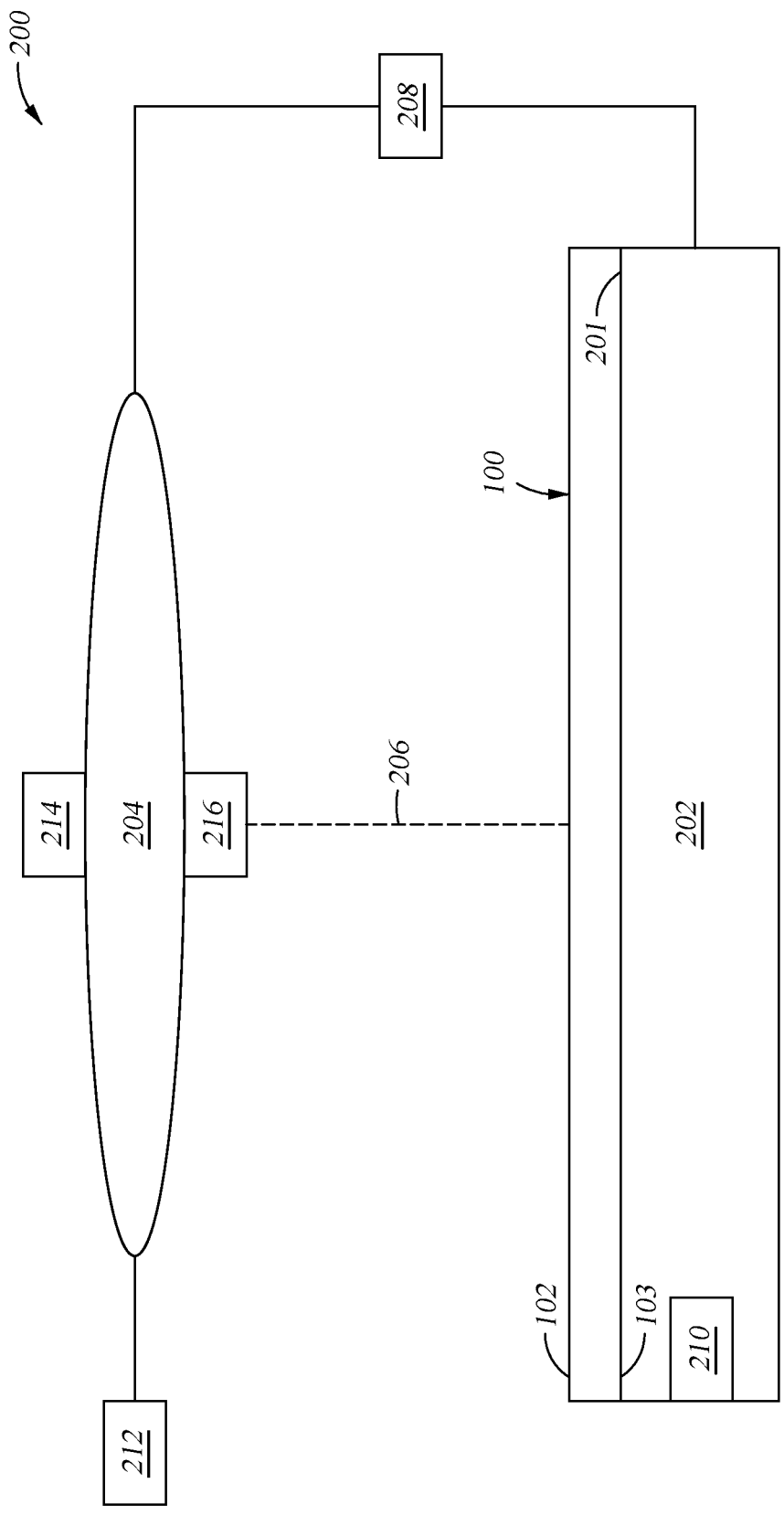
FIG. 2 is a schematic, cross-sectional view of a laser machining system according to embodiments.

FIG. 2 is a schematic, cross-sectional view of a laser machining system 200. The laser machining system is utilized in a method, such as the method 600, for dicing one or more optical devices from a substrate 100 with the laser machining system 200.

The laser machining system 200 includes a substrate 100 disposed on a surface 201 of a stage 202. The stage 202 is disposed in the laser machining system 200 such that the surface 201 of the stage 202 is positioned opposite of a scanner 204. The scanner 204 includes a laser source 214, an optical array 216, and a laser 206 disposed from the optical array 216. The laser machining system 200 is operable to dice the one or more optical devices 106 from the substrate 100 along the dicing path 104. The laser machining system 200 includes a controller 208. The controller 208 is in communication with the stage 202 and the scanner 204.

The laser machining system 200 is operable to dice one or more optical devices 106 from a substrate 100. In one embodiment, which can be combined with other embodiments described herein, the laser machining system 200 is operable to utilize filamentation to dice the one or more optical devices 106 from the substrate 100. Filamentation includes a radiation pulse from the laser source 214. The radiation pulse passes through the optical array 216 and is focused into the laser 206. The laser 206 etches a hole or a void in the substrate 100 through the thickness of the substrate 100 along the dicing path 104. In another embodiment, which can be combined with other embodiments described herein, the laser machining system 200 is operable to utilize laser ablation to dice the one or more optical devices 106 from the substrate 100. Laser ablation includes etching a trench into the substrate 100 along the dicing path 104 with the laser 206.

The controller 208 is generally designed to facilitate the control and automation of the methods described herein. The controller 208 may be coupled to or in communication with the laser source 214, the optical array 216, the stage 202, and the scanner 204. The stage 202 and the scanner 204 may provide information to the controller 208 regarding the method 600 and alignment of the substrate 100. The controller 208 may be in communication with or coupled to a CPU (i.e., a computer system). The CPU can be a hardware unit or combination of hardware units capable of executing software applications and processing data. In some configurations, the CPU includes a central processing unit (CPU), a digital signal processor (DSP), an application-specific integrated circuit (ASIC), a graphic processing unit (GPU) and/or a combination of such units. The CPU is generally configured to execute the one or more software applications and process stored media data. The controller 208 may include a non-transitory computer-readable medium for storing instructions of forming a dicing path along a substrate as described herein. The non-transitory computer-readable medium may be a part of the CPU.

The laser 206 is a pulsed laser. In one embodiment, which can be combined with other embodiments described herein, the laser 206 includes a Gaussian beam profile with a beam quality "M2-factor" of less than about 1.3. In another embodiment, which can be combined with other embodiments described herein, the laser 206 is a Bessel-type beam profile. In yet other embodiments, the laser 206 is a multi-focus laser and uses a bifocal lens as part of the optical array 216. Multiple lenses may also be used within the optical array 216 to diffract the laser 206 and form multiple focal points within the substrate 100. The laser 206 is in communication with the controller 208. The controller 208 may control other input parameters or output parameters of the laser 206, as described in the method 600.

The stage 202 includes a stage actuator 210. The stage actuator 210 allows the stage 202 to scan in the X direction, the Y direction, and the Z direction, as indicated by the coordinate system shown in FIG. 2. The stage 202 is coupled to the controller 208 in order to provide information of the location of the stage 202 to the controller 208. Additionally, the stage 202 is in communication with the controller 208 such that the stage 202 may move in a direction such that the laser 206 traces the dicing path 104.

The scanner 204 includes a scanner actuator 212. The scanner actuator 212 allows the scanner 204 to scan in the X direction, the Y direction, and the Z direction, as indicated by the coordinate system shown in FIG. 2. The laser source 214 and the optical array 216 are disposed in the scanner 204. The scanner 204 is coupled to the controller 208 in order to provide information of the location of the scanner 204 to the controller 208. Additionally, the scanner 204 is in communication with the controller 208 such that the scanner 204 may move the laser 206 to trace the dicing path 104. In one embodiment, which can be combined with other embodiments described herein, the scanner 204 is a galvo scanner.

In one embodiment, which can be combined with other embodiments described herein, the laser machining system 200 performing methods for dicing one or more optical devices 106 from a substrate 100 may utilize both the scanner 204 and the stage 202 to direct the laser 206 along the dicing path 104. In another embodiment, which can be combined with other embodiments described herein, the laser machining system 200 performing the methods for dicing one or more optical devices 106 from a substrate 100 may utilize only the scanner 204 to direct the laser 206 along the dicing path 104. In yet another embodiment, which can be combined with other embodiments described herein, the laser machining system 200 performing the methods for dicing one or more optical devices 106 from a substrate 100 may utilize only the stage 202 to direct the laser 206 along the dicing path 104.

In embodiments with a substrate 100 including glass, the scanner 204 and the laser 206 are in a fixed position. The stage 202 is scanned such that the laser 206 moves along the dicing path 104. The laser 206 includes a Bessel type beam profile. The laser 206 is an infrared laser. The wavelength of the laser 206 is about 1.0 µm to about 5 µm. The laser 206 is transparent in the substrate 100 including glass, and thus is able to dice the one or more optical devices 106 of the substrate 100. The laser 206 has a beam width of less than about 10 µm, such as less than about 5 µm, such as less than about 3 µm.

In embodiments with a substrate 100 including silicon carbide, the scanner 204, such as a galvo scanner, is utilized to scan the laser 206 along the dicing path 104. The stage 202 is utilized to scan the substrate 100 between the plurality of sections such that the laser 206 may move along each section along the dicing path 104. The laser 206 includes a Gaussian type beam profile. The laser 206 is absorptive in the substrate 100 which includes silicon carbide, and thus is able to dice the one or more optical devices 106 of the substrate 100. The laser 206 may be an infrared laser with a wavelength of about 1.0 µm to about 5 µm and the photon energy of the laser 206 may be less than about 1.0 eV.

Figure 3A:
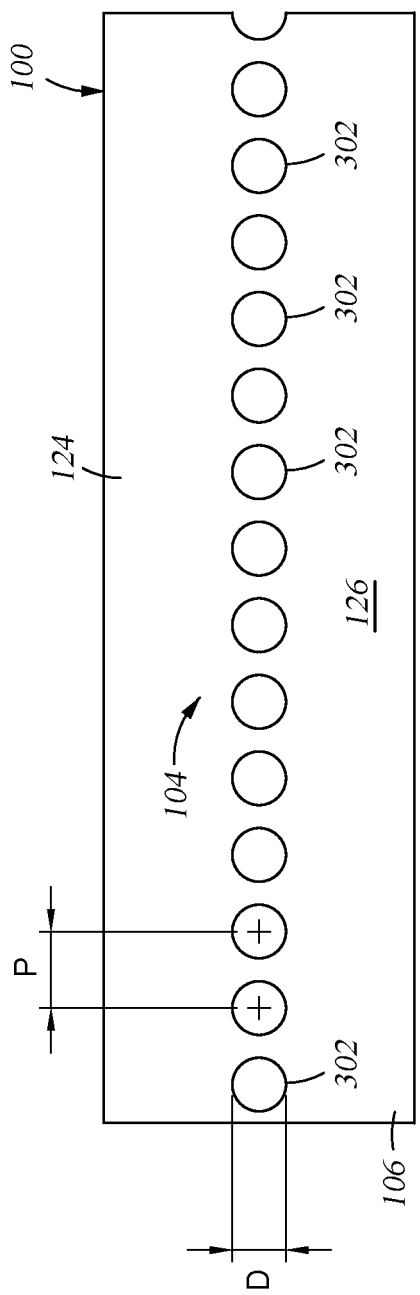
FIGS. 3A-3B are schematic, top views of a portion of the substrate along a dicing path according to embodiments.
Figure 3B:
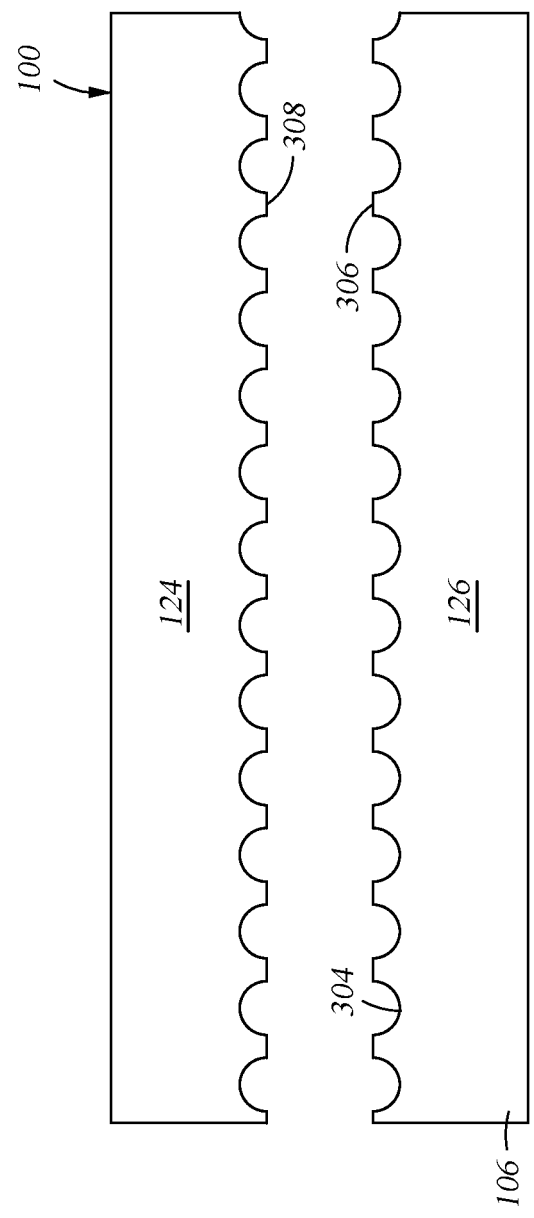

FIGS. 3A and 3B are schematic, top views of a portion of the substrate 100 along a dicing path 104 according to embodiments. FIG. 3A illustrates a portion of the substrate 100 along the dicing path 104. The dicing path 104 is disposed around an optical device 106 and separates the optical device 106 from an outer portion 124 of the substrate 100. The dicing path 104 is formed from a plurality of voids 302. The plurality of voids 302 are aligned with each other and disposed in a line or a curve to form a boundary between the outer portion 124 and the optical device portion 126.

The dicing path 104 is formed from a single row of voids 302. Each of the voids 302 may have a roughly circular or ovoid cross-section in the x-y plane. Each of the voids 302 has a diameter D. The diameter D is the largest axis through the cross section of the voids 302 along the x-y plane. Each adjacent void 302 has a pitch P therebetween. The pitch P is the distance from the center of the cross section of one void 302 and the center of the cross section of a second void 302. The pitch P is measured along the length of the dicing path 104. Reducing the diameter D of each of the voids 302 may subsequently reduce the pitch P between adjacent voids 302.

As discussed herein, a smaller diameter D and a smaller pitch P are beneficial in that the surface roughness of the side surface after separation of the optical device 106 from the rest of the substrate 100 is reduced when utilizing reduced diameters D and pitch P. In embodiments described herein, the diameter D of each of the voids 302 is less than about 3 µm, such as less than about 2 µm, such as less than about 1.5 µm. The pitch P of each of the voids 302 is less than about 5 µm, such as less than about 3 µm, such as less than about 2 µm.

As shown in FIG. 3B, the optical device portion 126 is split from the outer portion 124. Splitting the optical device portion 126 from the outer portion 124 is performed along the dicing path 104. Each of the voids 302 is therefore split into halves or partial voids 304. The splitting of the optical device portion 126 from the outer portion 124 occurs via mechanical or thermal separation, such that a portion of the substrate 100 is heated, cooled, or impacted by an outside force or load. Once the optical device portion 126 and the outer portion 124 are split, an optical device sidewall surface 306 and an outer portion side wall surface 308 are formed. The optical device sidewall surface 306 is the outer side wall surface of the optical device 106. The outer portion side wall surface 308 is the outer side wall surface of the outer portion 124.

Methods and apparatus as described herein are configured to reduce the surface roughness of the optical device sidewall surface 306. Methods described herein provide an optical device sidewall surface 306 with a surface roughness of less than about 0.3 µm, such as less than about 0.2 µm, such as less than about 0.1 µm. As discussed herein, as the void diameter D and pitch P decrease, the surface roughness also decreases.

Figure 3C:
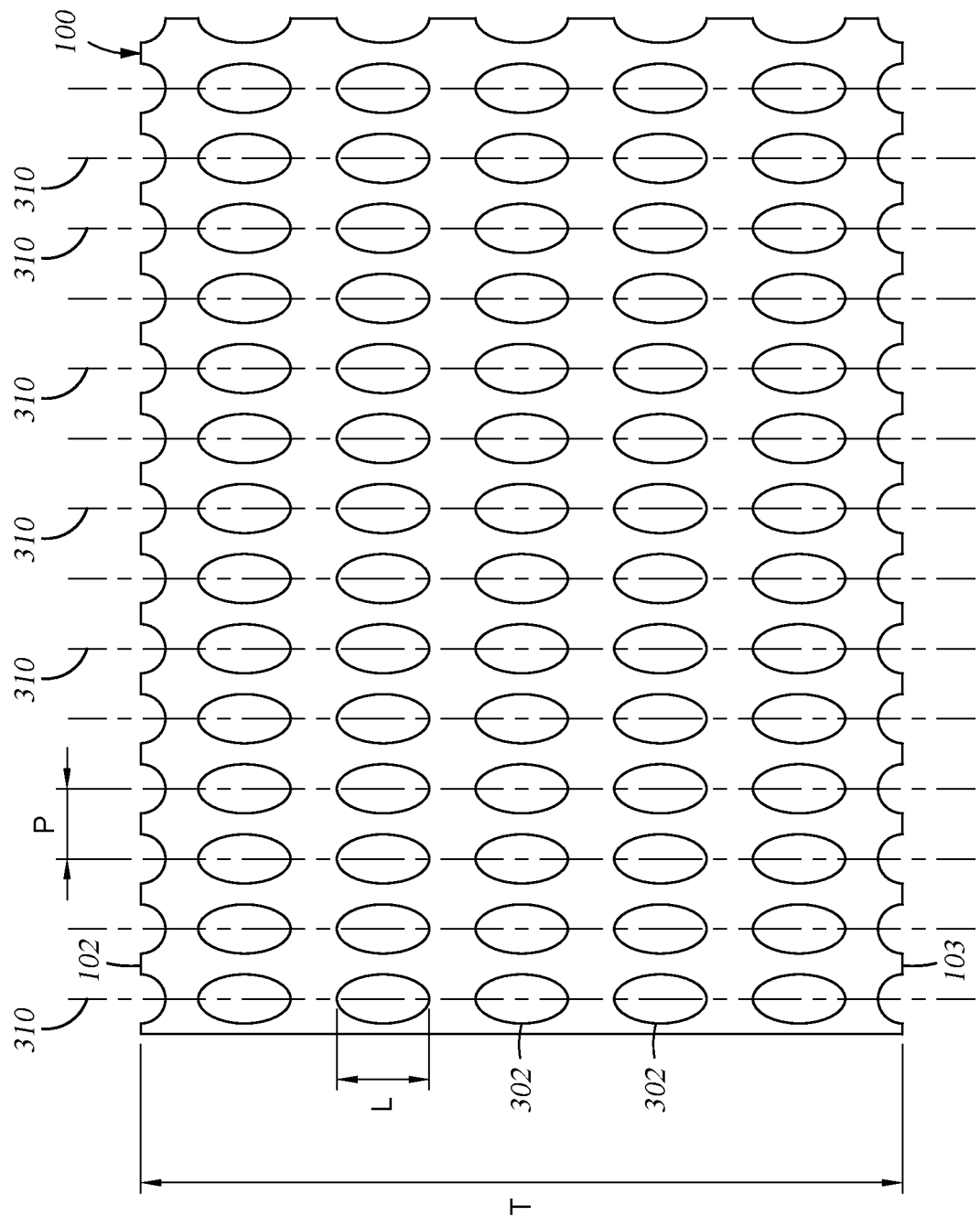
FIG. 3C is a schematic, cross-sectional view of a portion of the substrate along the dicing path according to embodiments.

FIG. 3C is a schematic, cross-sectional view of a portion of the substrate 100 along the dicing path 104. The voids 302 are formed in columns 310, such that a plurality of voids 302 are stacked along the column 310. In some embodiments, a laser beam with a single focal point is utilized, such as a Gaussian beam. Each of the voids 302 within a column 310 is formed by altering the focal length or the location of the focal point of the laser 206, such that the focal point of the laser 206 is disposed at a different depth within the thickness T of the substrate 100. In embodiments where a Bessel type laser beam is used, multiple voids 302 can be formed simultaneously through the substrate thickness T or an elongated single void is formed through the substrate thickness T. In some embodiments, all of the voids 302 within one column 310 are formed simultaneously using a Bessel type laser beam. In embodiments where a laser beam with multiple focal points or a special beam profile using diffractive optics elements (DOEs) is used, multiple or all of the voids 302 within a column 310 are formed simultaneously. Each of the columns 310 may be parallel to one another and disposed normal to the top surface 102 of the substrate 100.

Each of the columns 310 includes 1 to 30 voids, such as 5 to 20 voids, such as 5 to 15 voids, such as 7 to 15 voids, such as 10 to 15 voids. The number of voids within each column 310 may be dependent upon the thickness of the substrate 100 and the diameter D of each of the voids 302. The length L of each of the voids 302 along the column 310 is variable depending upon the type of optical array 216 utilized. In some embodiments, the length L of each of the voids 302 is about 0.5 μm to about 15 μm, such as about 1 μm to about 12 μm. The relative diameter D and pitch P between each void 302 in the columns 310 is the same, such that the pitch P between a void 302 within a first column and a void 302 within a second column is similar throughout the thickness T of the substrate 100.

The voids 302 are substantially evenly spaced along the column 310 between the top surface 102 and the bottom surface 103 of the substrate. In some embodiments, each column 310 of voids 302 is formed using a single burst of laser pulses, such that a first burst of laser pulses is administered to the substrate 100 and forms a first column 310 of voids 302 before moving the relative location of the laser 206 to the substrate 100 and delivering a second burst of laser pulses to the substrate 100 to form a second column 310 of voids 302. The repeated exposure of the substrate 100 to bursts of laser pulses at different locations along the dicing path 104 forms a plurality of columns 310 of voids 302 along the dicing path 104.

FIG. 4 is a schematic, cross-sectional view of an optical array 216 disposed above the substrate 100. The optical array 216 includes a beam 404 of radiation entering one or more lenses 402. The one or more lenses 402 focus the beam 404 into the laser 206 which has a focal point or focal region within the substrate 100. The optical array 216 enables the formation of voids 302 within the substrate 100.

The beam 404 may be radiation emitted at a wavelength of about 1.0 μm to about 5 μm, such as about 1.3 μm to about 5 μm, such as about 1.3 μm to about 4 μm. The beam 404 may be a collimated beam emitted by a laser source, such as the laser source 214. The beam 404 may include radiation with a limited wavelength and amplitude.

The one or more lenses 402 are configured to concentrate the beam 404 into a laser. As shown herein, the one or more lenses 402 is a single lens. The lens shown is an axicon lens and is used to form a Bessel beam. Other types of lens assemblies may also be utilized in place of the one or more lenses 402. In some embodiments, the one or more lenses 402 may be a concave lens, a convex lens, a plano-convex lens, or a meniscus lens. The one or more lenses 402 may have multiple focal points. The multiple focal points may be due to the use of a bifocal lens, a trifocal lens, or a diffractive optical element. In some embodiments, the laser 206 is output from the one or more lenses 402 as a Gaussian beam.

As shown in FIG. 4, the one or more lenses 402 is an axicon lens which forms a Bessel beam. The laser 206 is formed by the one or more lenses 402 and includes a low intensity region 406 and a high intensity region 408. The low intensity region 406 is the portion of the laser 206 with a lower radiation concentration than the high intensity region 408. The radiation concentration within the high intensity region 408 is high enough to form a crack or a void, such as the voids 302 within the substrate 100. The radiation concentration within the high intensity region 408 may be greater than about $1 \cdot 10^9$ W/cm$^2$, such as greater than about $1 \cdot 10^{10}$ W/cm$^2$, such as greater than about $1 \cdot 10^{12}$ W/cm$^2$, such as greater than about $1 \cdot 10^{15}$ W/cm$^2$. The high intensity region 408 is positioned within the substrate 100. The substrate 100 is made from a material for which the radiation of the laser 206 is transparent. However, within the high intensity region 408, the energy concentration is high enough to cause phase transitions within the substrate 100 and form the voids 302.

The optical array 216 is disposed above the top surface 102 of the substrate 100. The high intensity region 408 and/or the focal point of the laser 206 is disposed within the body 410 of the substrate 100.

Figure 5:
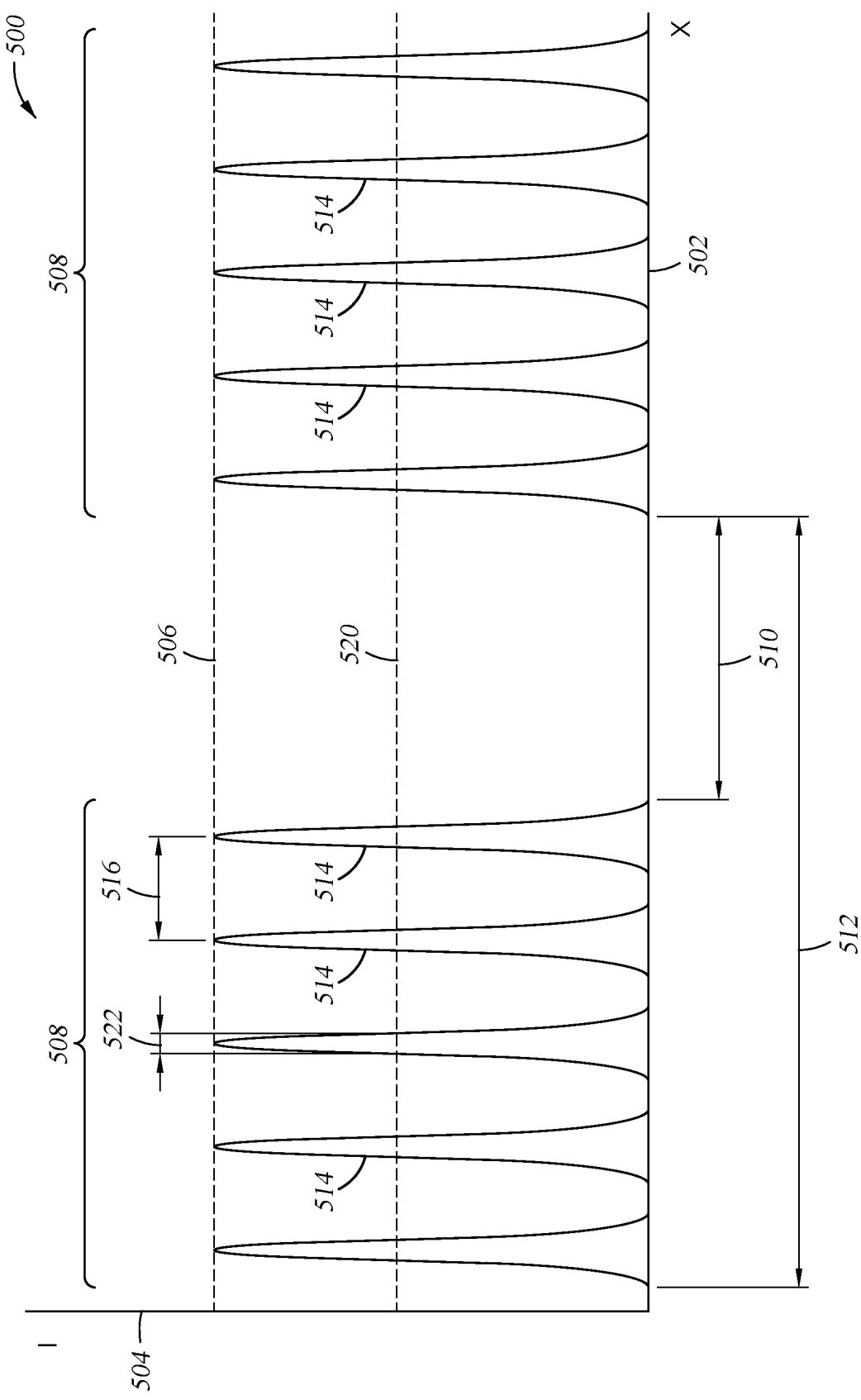
FIG. 5 is a graph illustrating laser pulse applications to the substrate according to embodiments.

FIG. 5 is a graph 500 illustrating a plurality of laser pulse 514 deliveries to the substrate 100. The laser pulses 514 are delivered to the substrate 100 over a period of time 502 and have controlled intensities 504. Each of the laser pulses 514 has a maximum pulse energy 506 of greater than about 75 μJ, such as greater than about 100 μJ, such as greater than about 200 μJ. Each individual laser pulse 514 is delivered as part of a burst 508.

Each burst 508 is delivered to one location along the dicing path 104, such that a first burst 508 is delivered to a first location along the dicing path 104 and a second burst 508 is delivered to a second location along the dicing path 104. Five laser pulses 514 are shown within each burst 508 herein, but other quantities of bursts are also contemplated, such as 5 to 40 individual laser pulses 514, such as 5 to 20 individual pulses, such as 6 to 15 individual laser pulses 514, such as 8 to 15 individual laser pulses, such as 8 to 12 individual laser pulses.

Each of the individual laser pulses 514 are administered at a pulse repetition time 516 of less than about $1 \cdot 10^{-9}$ s, such as less than about $2 \cdot 10^{-8}$ s. A pulse repetition frequency is the inverse of the pulse repetition time 516, such that the pulse repetition frequency is greater than about 25 MHz, such as greater than about 30 MHz, such as greater than about 40 MHz, such as greater than about 50 MHz, such as about 1 GHz or higher. High pulse repetition frequencies have been found to reduce the maximum pulse energy 506 of each of the laser pulses 514 during formation of the voids 302. The pulse repetition frequency is defined as the rate at which the laser pulses 514 are administered to the substrate 100 within each burst 508.

The burst to burst time 512 is the amount of time from the start of one burst 508 to the start of the subsequent burst 508. As described herein, the burst to burst time 512 is less than about 15 μs, such as less than about 5 μs, such as less than about 2 μs. The burst to burst frequency is the inverse of the burst to burst time 512. Therefore, the burst to burst frequency is greater than about 65 kHz, such as greater than about 200 kHz, such as greater than about 400 kHz. The burst to burst time 512 and therefore the burst to burst frequency are limited by the pulse repetition frequency, the number of pulses, and a burst gap 510. The burst gap 510 is the amount of time between each burst 508. The burst gap 510 may be large enough to enable one or both of the laser and the substrate to be moved relative to one another, such that the subsequent burst is applied to a different portion of the substrate 100 at a different section of the dicing path 104. The burst gap 510 as described herein is less than about 15 µs, such as less than about 5 µs, such as less than about 2 µs.

When the intensity 504 of each laser pulse 514 is greater than a phase change energy 520, the voids 302 are formed within the substrate 100. The phase change energy 520 may be greater than about 0.5 eV, such as greater than about 0.55 eV. A pulse width 522 is defined as the forward width at half maximum (FWHM) of the peak intensity of the pulse. For methods described herein, the pulse width 522 is less than about 15 picoseconds (ps), such as less than about 11 ps, such as about 10 ps or less, such as less than about 5 ps, such as about 2 ps or less.

Figure 6:
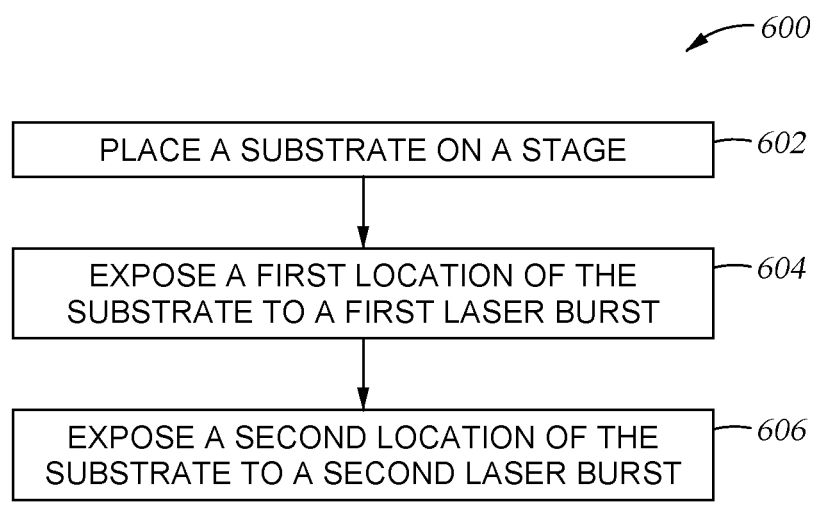
FIG. 6 is a method of forming the dicing path according to embodiments.

FIG. 6 is a method 600 of forming the dicing path 104. The method 600 described herein enables smoother optical device sidewall surface 306, such as optical device sidewall surface 306 with a surface roughness of less than about 0.3 µm, such as less than about 0.2 µm, such as less than about 0.1 µm. The method 600 includes placing a substrate, such as the substrate 100, onto a stage, such as the stage 202, during an operation 602. The substrate may be placed on the stage with the optical devices facing either upwards towards a scanner or downwards, such that the optical devices face a surface of the stage.

After the substrate is placed on the stage, a first location on the substrate is exposed to a first laser burst during an operation 604. The first laser burst includes a plurality of laser pulses. Each of the laser pulses has a pulse width of less than about 15 ps, such as less than about 11 ps, such as about 10 ps or less, such as less than about 5 ps, such as about 2 ps or less. The wavelength of the laser of the laser pulses has a wavelength of about 1.0 µm to about 5 µm, such as about 1.3 µm to about 5 µm, such as about 1.3 µm to about 4 µm. The maximum pulse energy of each of the laser pulses is greater than about 75 µJ, such as greater than about 100 µJ, such as greater than about 200 µJ.

The first laser burst includes 5 to 40 individual laser pulses, such as 5 to 20 individual pulses, such as 6 to 15 individual laser pulses, such as 8 to 15 individual laser pulses, such as 8 to 12 individual laser pulses. Each of the individual laser pulses within the burst is delivered at a rate pulse repetition time of less than about $1 \cdot 10^{-9}$ s, such as less than about $2 \cdot 10^{-8}$ s. A pulse repetition frequency is the inverse of the pulse repetition time, such that the pulse repetition frequency is greater than about 25 MHz, such as greater than about 30 MHz, such as greater than about 40 MHz, such as greater than about 50 MHz, such as about 1 GHz or higher. The burst-to-burst frequency is greater than about 65 kHz, such as greater than about 200 kHz, such as greater than about 400 kHz.

The laser pulses applied to the first location may be a Bessel beam or a Gaussian beam. In yet other embodiments, the laser pulses are multi-focus point lasers formed by a multi-focus lens or a diffractive optic element.

When delivering the laser pulses to the substrate, a focal point of the laser is disposed within the substrate, such as between a top surface and a bottom surface of the substrate. In some embodiments, the location of the focal point of the laser is changed between the laser pulses, such as between each laser pulse or between each pair of two laser pulses, or each set of three laser pulses. In other embodiments where a Bessel beam or multi-focus beam are utilized, the location of the focal point of the laser is changed only periodically, such as only 1-2 times per burst to generate cracking or phase modification along different layers depth-wise within the material. The location of the focal point is changed to be at a different position within the thickness of the substrate, such that the first laser burst creates a first column of voids through the substrate as described with respect to FIG. 3C. Each of the voids may be formed by one or more of the laser pulses within the first laser burst. A controller may control the process parameters and location of the laser pulses as they are delivered to the substrate.

The combination of the above process conditions, such as a pulse width of less than about 15 ps and a pulse repetition frequency of greater than about 25 MHz have been shown to reduce void diameters and reduce the amount of pulse energy applied to each location on the substrate. The increased pulse repetition frequency and reduced pulse width enable providing an equivalent or higher peak power while reducing or maintaining the same void diameter. In some embodiments, the laser pulse width is less than about 10 ps, such as less than 500 femtoseconds (fs) and the pulse repetition frequency is greater than about 50 MHz. In another embodiment, the pulse repetition frequency is greater than about 1 GHz and the pulse width is less than about 10 ps, such as less than 500 fs. The pulse width may cause reductions in achievable pulse energy, as a ratio of pulse energy to pulse width is limited. Longer pulse widths therefore enable higher pulse energy application. Higher pulse energy application increases the average power application. In some embodiments, increased power application reduced reliability of void formation. However, higher power may also lead to increased processing throughput, such that 10 ps laser pulses at a repetition frequency of 1 GHz with an 80 W laser have been found to have higher processing speeds than 500 fs laser pulses at a repetition frequency of 1 GHz with a 20 W laser with little change in dicing quality. Increasing the pulse repetition frequency enables bursts of 10 or more pulses per burst. The reduced void diameters enables a smaller pitch between each void and lower surface roughness along the dicing path. The reduced pulse energy and pulse width further has been shown to reduce thermal stress around each of the voids within the substrate.

A laser wavelength of about 1.3 µm to about 4 µm is more optically transparent in glass. Improved optical transparency of the laser within the substrate enables smaller energy absorption cross sections and reduced damage spot size. Reduced damage spot size enables smaller voids and a reduced pitch between each of the voids. Reduced void diameter and pitch further reduce the surface roughness after separating the substrate along the dicing path.

The pulse widths and pulse repetition frequencies described herein have further been shown to reduce the energy input to the substrate. The short pulse width, high pulse frequency, and longer wavelengths cause reduced thermal stress in zones effected by laser exposure.

After exposing the first location of the substrate to the first laser burst during the operation 604, a second location of the substrate is exposed to a second laser burst during a subsequent operation 606. Exposing the second location of the substrate to the second laser burst may be similar to exposing the first location of the substrate to the first laser burst, but the laser pulses are delivered to a different location along the dicing path. The second laser burst forms a second column of voids within the substrate. The second location is a location different from the first location, but along the desired dicing path of the substrate. The desired dicing path may be determined by the controller before delivery of the first and second laser bursts to the substrate to form at least a portion of the dicing path.

The method 600 described herein may further include additional iterations of laser burst exposure at different locations along the dicing path, such as a third laser burst exposure at a third location along the dicing path and a fourth laser burst exposure at a fourth location along the dicing path. The number of laser burst exposures may be dependent upon the length of the dicing path, the void diameters, and the pitch between the voids.

The burst-to-burst frequency determines the rate at which the dicing path is formed along the substrate. The burst-to-burst frequency may be determined as the frequency at which the second laser burst exposure occurs after the first laser burst exposure. The decrease in pitch between each void increases the number of voids which should be formed for a similar length dicing path. Therefore, the burst-to-burst frequency may be increased when the pitch is decreased to maintain or enhance the rate of formation of the dicing path. As described herein, the burst-to-burst frequency is greater than about 65 kHz, such as greater than about 200 kHz, such as greater than about 400 kHz.

Methods and apparatus described herein enable lower surface roughness along an edge of a device after being diced from a substrate. The lower surface roughness is caused by reduced void diameter, reduced pitch between each void, and reduced thermal stress along the edge of the device. The reduced void diameter, reduced pitch, and reduced thermal stress are caused by a decrease in pulse width, an increase in pulse repetition rate, and the use of laser wavelengths which are more optically transparent within the substrate.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
    forming a plurality of voids within a substrate along a dicing path by exposing the substrate to a first burst of laser pulses at a first location along the dicing path of a respective waveguide combiner, the substrate having a plurality of waveguides, each waveguide having optical device structures, each of the laser pulses within the first burst having a pulse width of less than about 15 picoseconds and a pulse repetition frequency of greater than about 30 MHz and each laser pulse within the first burst forming a respective void within a first column at the first location to form the plurality of voids;
    exposing the substrate to a second burst of laser pulses at a second location along the dicing path of the respective waveguide combiner, each laser pulse within the second burst forming the respective void within a second column at the second location to form the plurality of voids, the first column and the second column are spaced by a pitch between a center of the first column and the second column along the dicing path; and
    separating the respective waveguide combiner from the substrate.

2. The method of claim 1, wherein each of the laser pulses has a laser wavelength of about 1.0 μm to about 5 μm.

3. The method of claim 1, wherein the substrate is a glass material and has a bandgap of about 5 eV to about 12 eV.

4. The method of claim 1, wherein each laser pulse has a pulse energy of less than about 100 μJ.

5. The method of claim 1, wherein each of the plurality of voids has a diameter of less than about 2 μm.

6. The method of claim 1, wherein there are 5 to 40 laser pulses within the first burst.

7. The method of claim 1, wherein the first burst of laser pulses is repeated at a burst frequency of greater than about 65 KHz.

8. A method comprising:
    exposing a substrate to a first plurality of laser pulses at a first location along a dicing path of a respective waveguide combiner, the substrate having a plurality of waveguides, each waveguide having optical device structures, each of the laser pulses within the first plurality of laser pulses having a laser wavelength of about 1.0 μm to about 5 μm and a pulse repetition frequency of greater than about 50 MHz and each laser pulse within the first plurality of laser pulses forming a respective void within a first column at the first location to form a plurality of voids;
    exposing the substrate to a second plurality of laser pulses at a second location along the dicing path of the respective waveguide combiner, each laser pulse within the second plurality of laser pulses forming the respective void within a second column at the second location to form the plurality of voids, the first column and the second column are spaced by a pitch between a center of the first column and the second column along the dicing path; and
    separating the respective waveguide combiner from the substrate.

9. The method of claim 8, wherein each of the laser pulses has a pulse width of less than about 12 picoseconds.

10. The method of claim 8, wherein the pulse repetition frequency is greater than about 1 GHz.

11. The method of claim 8, wherein the first plurality of laser pulses are delivered to the substrate in a first burst of 5 to 40 laser pulses at the first location on the substrate along the dicing path and the second plurality of laser pulses are delivered to the substrate in a second burst of 5 to 40 laser pulses at the second location on the substrate along the dicing path.

12. The method of claim 11, wherein the pitch between the first column and the second column is less than about 3 μm.

13. The method of claim 11, wherein a focal point of each laser pulse of the first burst is delivered at varying depth within the substrate.

14. The method of claim 8, wherein the laser pulses are delivered to the substrate as a Bessel beam or a Gaussian beam.

15. The method of claim 8, wherein a focal point of each of a laser delivering the laser pulses is disposed within the substrate during delivery of each of the laser pulses.

16. The method of claim 8, wherein each laser pulse has a pulse energy of less than about 100 μJ.

17. A non-transitory computer-readable medium storing instructions that, when executed by a processor, cause a computer system to perform operations of:
    exposing a substrate to a first plurality of laser pulses at a first location along a dicing path of a respective waveguide combiner, the substrate having a plurality of waveguides, each waveguide having optical device structures, each of the laser pulses within the first plurality of laser pulses having a laser wavelength of about 1.0 μm to about 5 μm and a pulse repetition frequency of greater than about 50 MHz and each laser pulse within the first plurality of laser pulses forming a respective void within a first column at the first location to form a plurality of voids;

exposing the substrate to a second plurality of laser pulses at a second location along the dicing path of the respective waveguide combiner, each laser pulse within the second plurality of laser pulses forming the respective void within a second column at the second location to form the plurality of voids, the first column and the second column are spaced by a pitch between a center of the first column and the second column along the dicing path; and separating the respective waveguide combiner from the substrate.

18. The medium of claim 17, wherein the first plurality of laser pulses are delivered to the substrate in a first burst of 5 to 40 laser pulses at the first location on the substrate along the dicing path and the second plurality of laser pulses are delivered to the substrate in a second burst of 5 to 40 laser pulses at the second location on the substrate along the dicing path.

19. The medium of claim 18, wherein the pitch between the first column and the second column is less than about 3 μm.

20. The medium of claim 19, wherein the pulse repetition frequency is greater than about 1 GHz.

21. The method of claim 1, wherein separating the respective waveguide combiner from the substrate comprises mechanically separating the respective waveguide combiner along the dicing path.

22. The method of claim 1, wherein separating the respective waveguide combiner from the substrate comprises thermally separating the respective waveguide combiner along the dicing path.

23. The method of claim 1, wherein the optical device structures have dimensions less than one micron.

* * * * *